United States Patent Office 2,941,134
Patented June 14, 1960

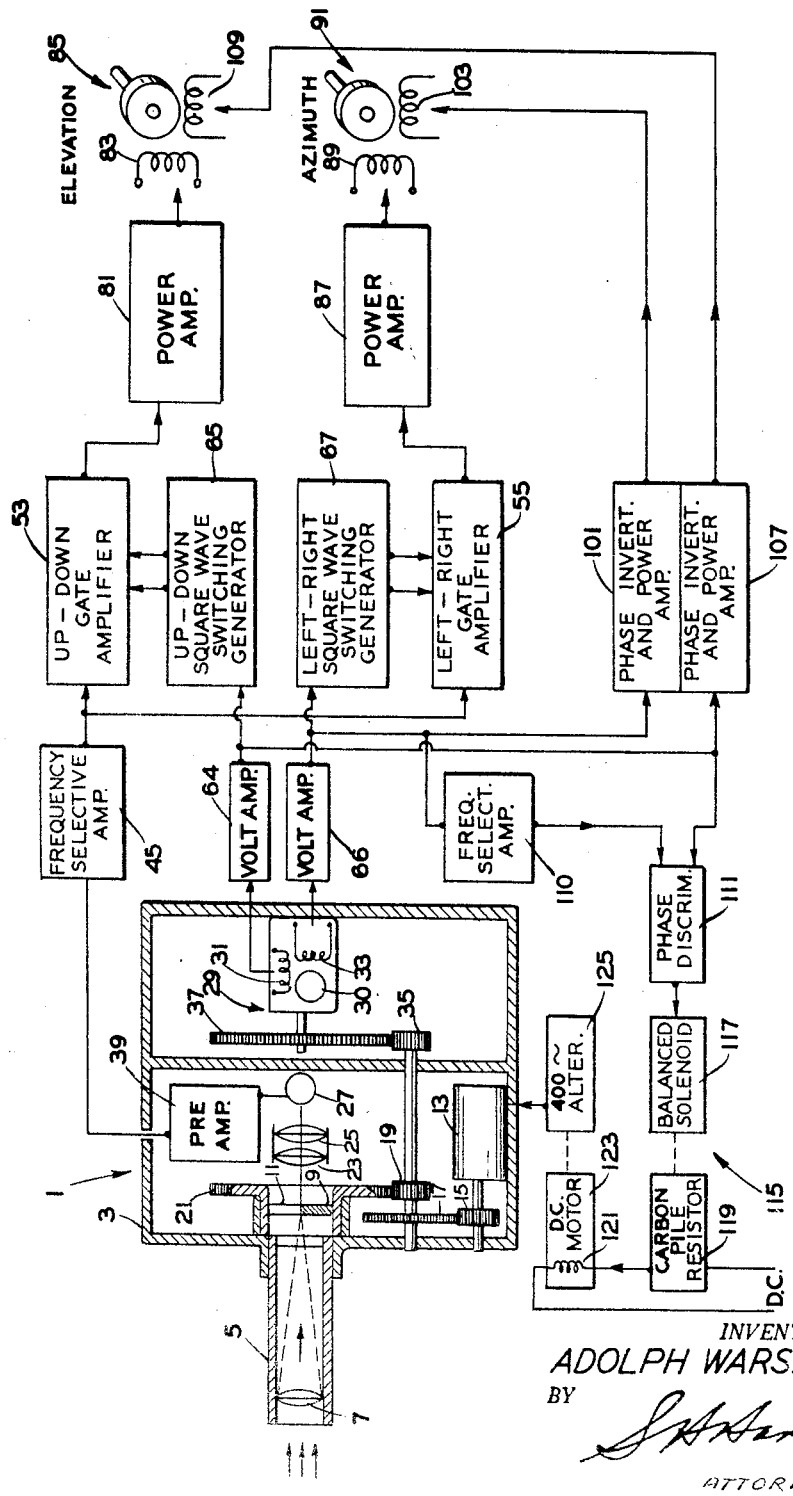

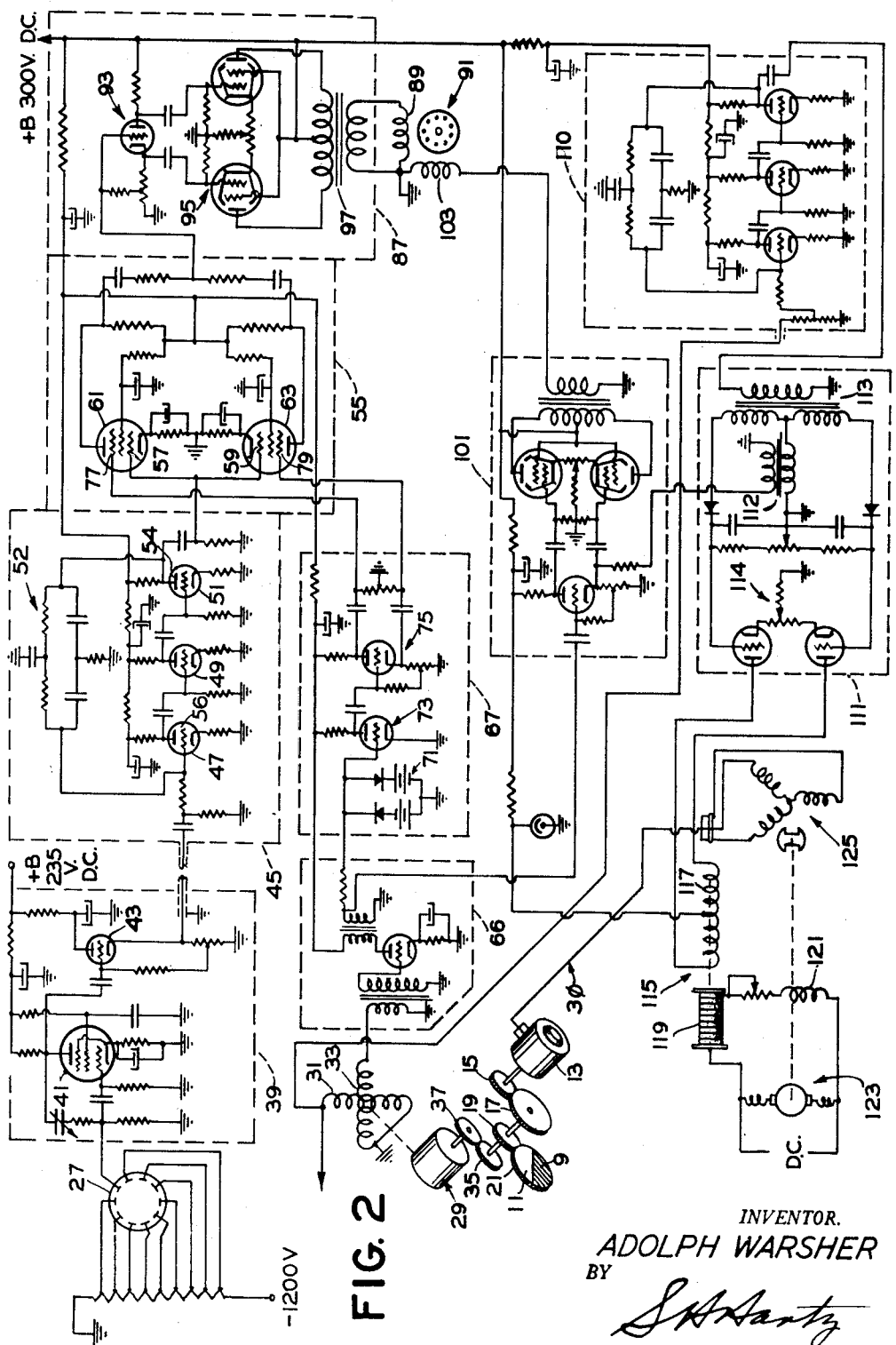

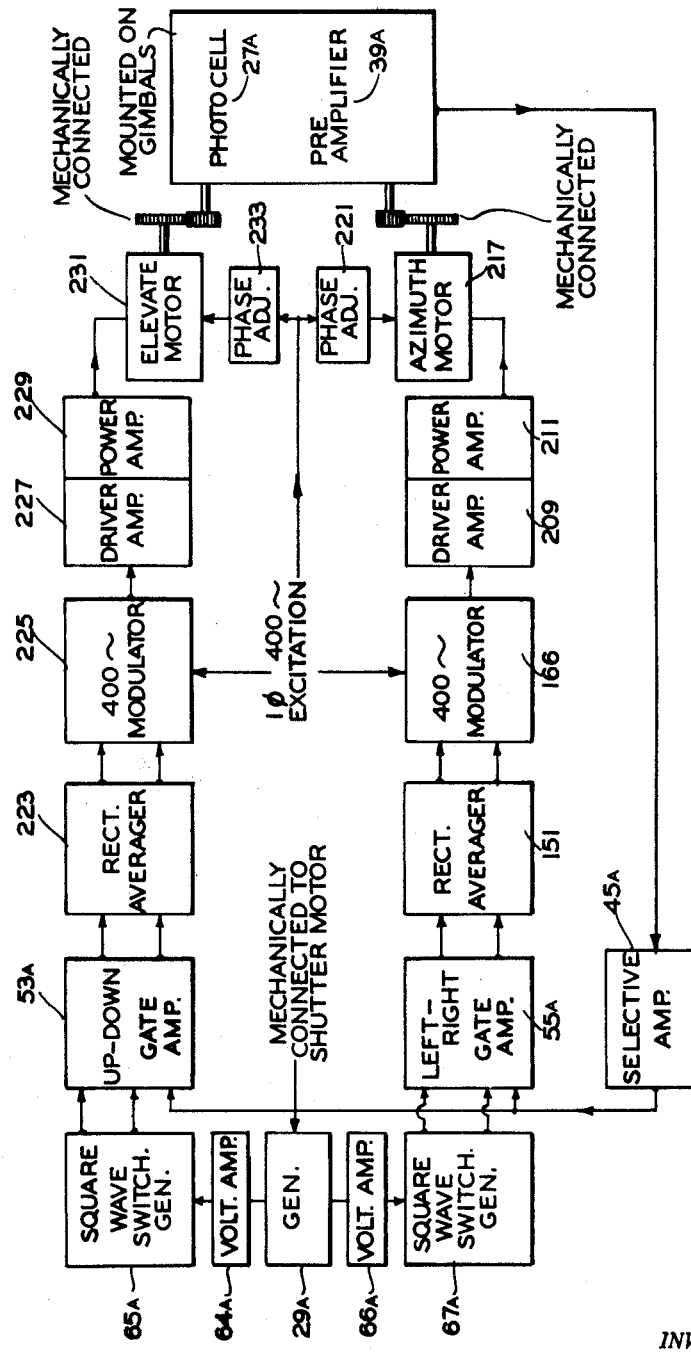

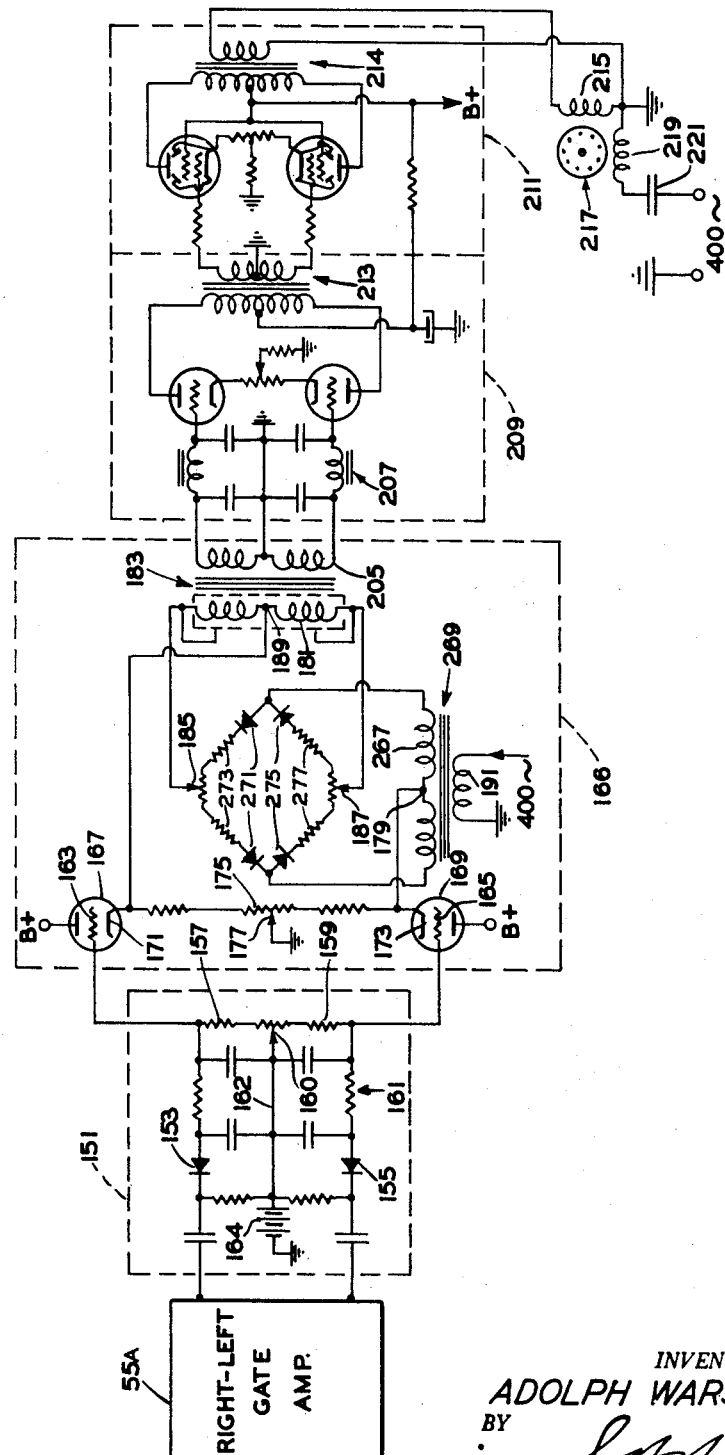

2,941,134

AUTOMATIC MOTOR CONTROL FOR CELESTIAL NAVIGATION DEVICE

Adolph Warsher, Maywood, N.J., assignor to Bendix Aviation Corporation, Teterboro, N.J., a corporation of Delaware Filed Jan. 11, 1950, Ser. No. 137,925

5 Claims. (Cl. 318—19)

The invention relates to automatic navigation devices and more particularly to a device in which one or more celestial bodies may be used as reference.

One object of the invention is to provide a celestial navigator for guiding ships, aircraft or other moving vehicles on a prescribed course.

Another object is to provide a celestial navigator of high accuracy.

Another object is to provide a celestial navigator which may be used at any altitude.

Another object is to provide a novel motor speed controller.

Another object is to provide a novel modulator for generating a modulated constant frequency voltage as determined by a slowly varying differential potential.

The rays from a celestial body or other suitable source of radiant energy are directed to means sensitive to such rays and the rays are occulted periodically by a shutter or other suitable means and provide an undulating signal when the quantity of energy falling on the sensitive means varies with the position of the shutter, as described in co-pending application Serial No. 137,977, filed January 11, 1950, now Patent No. 2,867,393, by Robert M. Burley. The co-pending application contemplates the use of a commutative means for changing direct current to pulsating current for use as reference voltages for comparing the phase of the signal therewith and determining the position of the light beam relative to the shutter rotation axis. The commutative means is likely to arc at high altitudes and the reversing motors are inefficiently operated.

The present invention contemplates the use of a non-commutative permanent magnet generator for obtaining two reference voltages in quadrature with one another and of the same frequency as the signal, and using the voltages to switch or gate a plurality of amplifiers to control operation of a pair of reversible motors in response to the signal to orient the device and center the rays on the rotation axis of the shutter. One of the reference voltages is used to control the speed of the shutter drive motor by comparing the phase of the reference voltage with the output of a frequency selective amplifier whose phase shifts with change of frequency.

In one embodiment of the invention, the reference voltages are amplified and applied to the fixed phase stator windings of the reversible motors and the output of the gate amplifiers is applied to the variable phase stator windings of the reversible motors.

In another embodiment, the outputs of each gate amplifier control a modulator connected to a source of different frequency than the signal. The outputs of the modulators, of the same frequency as the source, are applied to the variable phase stator windings of the motors and the fixed phase stator windings of the motors are energized directly from the source through a phase shifting reactance.

The foregoing and other objects and advantages of the invention will appear more fully hereinafter from a consideration of the detailed description which follows, taken together with the accompanying drawings wherein two embodiments of the invention are illustrated. It is to be expressly understood, however, that the drawings are for the purposes of illustration and description only, and are not to be construed as defining the limits of the invention.

In the drawings, Figure 1 is a block diagram showing one embodiment of the invention.

Figure 2 is a schematic wiring diagram of the arrangement shown in Figure 1, but includes only one control channel.

Figure 3 is a block diagram of a second embodiment of the invention; and

Figure 4 is a partial schematic wiring diagram of the embodiment shown in Figure 3 and shows a modification of the circuit of Figure 2.

Referring now to the drawings for a more detailed description of the celestial navigator of the present invention, the latter is shown in Figure 1 as including a scanning means 1 substantially of the kind shown in the above-mentioned co-pending application, and including a box-like housing 3 mounting a telescope 5 having an objective lens 7. A shutter 9 with a semicircular transluscent or transparent portion 11 is rotated by a synchronous motor 13 through gears 15, 17 and 19, the latter meshing with the toothed periphery 21 of the shutter. The telescope is directed toward a celestial body, such as a star, so that rays from the body are focused on the plane of the shutter.

Lenses 23, 25 concentrate the rays passed by the shutter on the photo multiplier tube 27. When the optical system is displaced so that the star image is not centered on the rotation axis of the shutter, the amount of energy falling on the tube varies periodically and the photo tube produces an undulating signal. The phase of the signal is determined by the direction of displacement of the star image from the rotation axis of the shutter.

A non-commutative generator 29 having a permanent magnet rotor 30 and stator windings 31, 33 is driven by motor 13 through gears 35, 37 at the same speed as shutter 9 and preferably generates a pair of sinusoidal voltages in quadrature with one another and of the same frequency as the fundamental frequency of the signal.

Referring to Figures 1 and 2, the signal from the photo multiplier tube 27 is amplified by a preamplifier 39 of any suitable kind and which may include a pentode 41 and a triode 43. The output of the preamplifier is passed to a selective three-stage amplifier 45 tuned to a selected frequency and including triodes 47, 49, 51 and null feedback network 52 connected between the plate 54 of triode 51 and the grid 56 of triode 47. The output from tuned amplifier 45 comprises only the fundamental signal frequency and is fed to up-down gate amplifier 53 and left-right gate amplifier 55 which are operated synchronously with the shutter as described below. Since the up-down gate amplifier is identiacal to the left-right gate amplifier, in Figure 2 only the left-right gate amplifier and associated channel are shown to simplify the wiring diagram. The output from amplifier 45 is shown impressed on control grids 57, 59 of tubes 61, 63.

The reference voltages from stator windings 31, 33 of generator 29 are amplified by voltage amplifiers 64, 66 and the amplified voltages are squared by square wave switching generators 65, 67, respectively, each of which includes a voltage limiter 71, a squared amplifier 73 and a phase inverter 75. Since the square wave switching generators for the reference voltages are identical, in Figure 2 only one of the switching generators is shown. The square wave outputs of the switching generators 65, 67 differ in phase by 90°. In Figure 1, one pair of square wave outputs 180° out of phase with one another, from switching generator 65, is fed to up-down gate amplifier 53 and the other pair of square wave outputs 180° out of phase with one another, from switching generator 67, is fed to left-right gate amplifier 55. As shown in Figure 2, the square wave outputs from switching generator 67 preferably are impressed on suppressor grids 77, 79 of tubes 61, 63, respectively, and each channel of gate amplifier 55 alternately blocks and passes the output of selective amplifier 45. The output of left-right gate amplifier 55 is fed to power amplifier 87 and the amplified output is impressed on the variable phase 89 of motor 91 for orienting telescope 5 in azimuth about a vertical axis. The output of up-down gate amplifier 53 (shown in Figure 1) is fed to power amplifier 81 and the amplified output is impressed on the variable phase 83 of motor 85 for orienting telescope 5 in elevation about a horizontal axis. Power amplifiers 81, 87 each may include a phase inverter 93 (see Figure 2) and a push-pull amplifier circuit 95 and the output of the amplifier circuit may be coupled by a transformer 97 to the motor field.

The amplified sinusoidal reference voltage from amplifier 66 is further amplified by power amplifier 101, and the amplified output is impressed on the fixed phase 103 of azimuth motor 91. The amplified sinusoidal reference voltage from voltage amplifier 64 is further amplified by power amplifier 107 and the amplified output is impressed on the fixed phase 109 of elevation motor 85. In Figure 2 only one voltage amplifier and power amplifier is shown. Each power amplifier 101, 107 is identical to amplifiers 81, 87.

Motors 85, 91 will operate whenever stator windings 83, 89 are energized by a voltage of the same frequency as the reference voltage, and the motors will drive the telescope about the respective axis in one direction or the other as determined by the phase relation of the signal and reference voltages so that the telescope is directed to center the image of the reference body on the shutter.

The speed of synchronous motor 13 must be maintained constant so that the amplified signal from preamplifier 39 has a predetermined fundamental frequency to which selective amplifier 45 is tuned. If the speed of synchronous motor 13 changes, selective amplifier 45 will shift the phase of its output relative to the reference voltages. This is undesirable.

The speed of synchronous motor 13 may be regulated by comparing the phase difference of the reference voltage from phase winding 33 of generator 29 with the output of a selective amplifier 110, similar to selective amplifier 45, connected to phase winding 31 of generator 29. The output of voltage amplifier 66 is fed by a transformer 112 (Figure 2) to a rectifier type phase discriminator 111 and the output of selective amplifier 110 is fed by a transformer 113 to phase discriminator 111 and the differential output of the phase discriminator is amplified at 114 and controls a carbon pile voltage regulator 115 including a balanced solenoid 117 and a carbon pile resistor 119. The resistor is connected in series with the field winding 121 of a D.C. motor 123 and motor 123 drives an alternator 125 which preferably generates 400 cycle three-phase power for operating synchronous motor 13. At the desired signal frequency, the voltages impressed on transformers 112 and 113 are in quadrature and discriminator 111 has zero differential output voltage. Discriminator 111 produces a differential output upon departure from the quadrature phase relation of the voltages impressed on transformers 112, 113 to energize solenoid 117 and change the resistance of the carbon pile 119 by changing the pressure exerted on it to vary the field current of motor 123, thereby changing its speed and the frequency of the output of alternator 125. Motor 13 is maintained at a predetermined speed so that the resulting frequency of the signal and reference voltages is at the predetermined frequency of tuned amplifiers 45 and 110.

The system shown in Figures 3 and 4 corresponds generally to the system shown in Figures 1 and 2 and described above except that the outputs of each gate amplifier are rectified and the differential rectified voltage controls a modulator excited by a voltage source preferably of 400 cycle constant excitation. The output of each modulator is amplified and fed to the variable phase stator windings of a reversible two-phase motor. The fixed phase stator windings are energized by the 400 cycle source through a phase shifting device.

In Figure 3, the signal from photocell 27a is amplified by preamplifier 39a and the amplified signal is fed to a selective amplifier 45a preferably tuned to 42 cycles. The reference voltages in quadrature with one another from generator 29a are amplified by voltage amplifiers 64a, 66a, respectively, and the amplified reference voltages are impressed on square wave switching generators 65a, 67a, respectively. The output of selective amplifier 45a is fed to up-down gate amplifier 53a and left-right gate amplifier 55a. The square waves from switching generator 65a are fed to up-down gate amplifier 53a and the square waves from switching generator 67a are fed to left-right gate amplifier 55a. The structure described is identical to the corresponding structure shown in Figures 1 and 2.

Since the azimuth and elevation channels in Figure 3 are identical, only the modified portion of the azimuth channel is shown in Figure 4 and is described in detail below.

In Figure 4, the outputs of left-right gate amplifier 55a are rectified and filtered by rectifier averager 151 which includes rectifier elements 153, 155 and filter network 161 having a time constant equal to about four scansions on the reference body. The output of rectifier averager 151 is taken differentially across resistors 157, 159 provided with a zero centering slider 160 connected to a common return path 162 for rectifiers 153, 155.

The differential output of rectifier averager 151 controls a modulator 166 through a balanced cathode follower coupling network. The output of rectifier averager 151 is differentially introduced to the grids 163, 165 of tubes 167, 169, respectively, of the cathode follower. The balanced cathode follower is initially adjusted so that cathodes 171, 173 of tubes 167, 169 are both at the same D.C. potential above ground reference by adjusting a potentiometer 175 connected between the cathodes and with its slider 177 connected to ground. Common return path 162 is maintained at a suitable potential indicated at 164 so that when the image of the reference body is centered on the shutter, grids 163, 165 have a desired potential relative to cathodes 171, 173 of tubes 167 and 169, respectively.

Modulator 166 includes a dual bridge circuit having the secondary 267 of a transformer 269 forming two legs of each bridge. The other two legs of one bridge each are formed by a rectifier 271 and a resistor 273, and the other two legs of the second bridge each are formed by a rectifier 275 and a resistor 277. Rectifiers 275 are arranged to pass current in a direction opposite to rectifiers 271. Cathode 173 is connected to a point 179 on transformer secondary 267 at which the resistances and number of turns at opposite sides of the point are equal.

The ends of the primary winding 181 of a transformer 183 are connected to adjustable terminals 185, 187 of the bridges. Cathode 171 is connected to a point 189 on primary winding 181 at which the resistances and number of turns on opposite sides of the point are equal. A voltage source, preferably of 400 cycles per second, is impressed on the primary 191 of transformer 269 and the voltage induced in secondary 267 causes current to flow alternately in one direction through one bridge circuit including rectifiers 271 and resistors 273 and then in the opposite direction through the other bridge circuit, including rectifiers 275 and resistors 277. The potential difference between points 179 and 189 is determined by the signal. Terminals 185, 187 are adjusted so that the terminals alternately assume the potential of point 179 as the rectified 400 cycle current flows through the associated legs of the bridge. The opposite ends of primary 181 connected to terminals 185, 187, assume the same potential as the terminals so that an alternating voltage of the same frequency as the voltage source is induced in the secondary 205 of transformer 183.

The amplitude of the 400 cycle output of modulator 166 across transformer 183 is determined by the differential output of the left-right gate amplifier 55a for each period preferably of four scansions on the reference body as effected by filter network 161, which prevents a change of voltage at a faster rate. The modulator is phase sensitive—that is, it can distinguish displacement of the image of the reference body to the left or to the right of the rotation axis of the shutter by reversal in polarity of differential D.C. voltage at points 179, 189. The phase of the 400 cycle output across transformer 183 is determined by the instantaneous polarity of points 179, 189.

Secondary 205 of transformer 183 is connected to a 400 cycle low pass filter 207, which filters out undesirable harmonics. The filtered output of modulator 166 is amplified by a push-pull driver amplifier 209 coupled by a transformer 213 to a push-pull power amplifier 211. Power amplifier 211 is coupled by a stepdown transformer 214 to the variable phase stator winding 215 of a motor 217. The fixed phase stator winding 219 of motor 217 is excited by the 400 cycle power source through a phase shifting condenser 221. The direction of rotation of motor 217 is controlled by the phase of the voltage impressed across stator winding 215 relative to the fixed phase of the voltage impressed across stator winding 219. The speed of motor 217 is determined by the amplitude of the differential output of rectifier averager 151.

In Figure 3, an arrangement corresponding to that just described is provided for controlling the telescope in elevation about a horizontal axis. The outputs of up-down gate amplifier 53a are fed to a rectifier averager 223 and its differential output controls a modulator 225 energized by a 400 cycle source. The modulator is phase sensitive—that is, it can distinguish displacement of the image of the reference body above or below the rotaton axis of the shutter. The 400 cycle output of modulator 225 is amplified by a driver amplifier 227 and a power amplifier 229 and the amplified output is impressed on the variable phase stator winding of elevation motor 231. The fixed phase stator winding of elevation motor 231 is energized through a phase adjuster 233 by the 400 cycle power source. Rectifier averager 223, modulator 225, driver amplifier 227, power amplifier 229, elevation motor 231, and phase adjuster 233 are substantially identical to the corresponding elements 151, 166, 209, 211, 217 and 221, respectively.

The arrangement shown in Figures 3 and 4 preferably is provided with a speed control for the shutter motor, as shown in Figures 1 and 2.

Although but two embodiments of the invention have been illustrated and described in detail, it is to be expressly understood that the invention is not limited thereto.

Various changes can be made in the design and arrangement of the parts without departing from the spirit and scope of the invention as the same will now be understood by those skilled in the art.

What is claimed is:

1. A system for directing an element to a reference, comprising a synchronous motor, signal means driven by said synchronous motor for providing a signal of predetermined frequency in response to deviation of said element from said reference, a selective amplifier tuned to the frequency of the signal and connected to said means, a generator driven by said synchronous motor and providing a pair of reference voltages in quadrature relationship with one another and of the same frequency as the signal, and a pair of further amplifiers receiving the signal from said selective amplifier, each of said further amplifiers having a pair of channels gated by one of the reference voltages, means controlled by the output of said further amplifiers for orienting the element about mutually perpendicular axes to return the element to the reference, and means operative in response to said reference voltages for maintaining the speed of said synchronous motor constant including a frequency sensitive means receiving one reference voltage and adapted to shift the phase of said one reference voltage relative to the other reference voltage when the frequency of said reference voltages is other than said predetermined frequency, and a phase discriminator including a rectifier and receiving the output of said frequency sensitive means and receiving the other reference voltage of said generator, a carbon pile voltage regulator controlled by the rectified output of said discriminator, a drive motor controlled by said carbon pile voltage regulator and an alternator driven by said drive motor, said alternator being connected to said synchronous motor whereby said synchronous motor drives said generator and said signal means at a speed to maintain the frequency of the reference voltages and signal at the predetermined frequency of the frequency sensitive means.

2. A control system comprising means sensitive to rays from a source of radiant energy, means for directing rays from the source to said sensitive means, a member periodically occulting said rays and cooperating with said sensitive means to produce an undulating signal of predetermined frequency when the quantity of energy falling on said sensitive means varies, a generator producing an alternating reference voltage of the same frequency as the signal, an amplifier having a pair of channels gated by the reference voltage and receiving the signal, the phase of the differential output voltage of said gated amplifier being determined by the direction of deviation of the directing means relative to the source, a rectifier for rectifying the output of said gated amplifier, a modulator controlled by the rectified output of said gated amplifier and energized by an alternating voltage source having a frequency different from the signal frequency, and a reversible motor having a variable phase energized in response to the output of said modulator and a fixed phase energized by the voltage source.

3. A control system for directing an element to a reference, comprising means for providing a signal of predetermined frequency in response to deviation of the element from the reference, means for providing reference voltages in quadrature with one another and of said predetermined frequency, a pair of gated amplifiers receiving the signal, each of said gated amplifiers having a plurality of channels gated by one of said reference voltages, a rectifier averager connected to each gated amplifier for rectifying the differential output voltage of each gated amplifier, the polarities of said outputs being determined by the directions of deviation of the element from the reference about mutually perpendicular axes, an alternating voltage source having a frequency different from said predetermined frequency, modulators controlled by said outputs and energized by said alternating voltage source, and a pair of reversible motors each having a variable phase energized in response to the output of one of said modulators and a fixed phase energized by said voltage source, said motors rotating said element about said mutually perpendicular axes for returning the element to the reference.

4. A device for controlling the speed of a synchronous motor, comprising a two-phase generator driven by said synchronous motor for producing a pair of voltages in quadrature with one another, frequency sensitive means tuned to a predetermined frequency and responsive to the voltage of one phase of said generator for producing a phase shift when the frequency departs from said predetermined frequency, a discriminator including rectifier means and responsive to the relative phases of the output of said frequency sensitive means and the other quadrature voltage, a carbon pile voltage regulator including a balanced solenoid receiving the output of said phase discriminator and a carbon pile resistor responsive to said solenoid, a driving motor responsive to said resistor and adapted to be energized by a power source, and an alternator driven by said driving motor and energizing said synchronous motor.

5. In a device of the kind described for operating a synchronous motor at a predetermined speed, an alternating current two-phase generator driven by said motor and producing voltages in quadrature with one another, selective means connected to one phase of the generator and tuned to a predetermined frequency, a phase discriminator responsive to the output of said selective means and the other phase of said generator and discriminating between their relative phases, a carbon pile voltage regulator controlled by the output of said discriminator, a driving motor controlled by said carbon pile voltage regulator and an alternator driven by said driving motor, said alternator being connected electrically to said synchronous motor whereby said synchronous motor drives said generator at a speed to maintain the frequency of the generated voltages at the predetermined frequency of the frequency selective means.

References Cited in the file of this patent

UNITED STATES PATENTS

| | | |
|---|---|---|
| 1,960,086 | Godsey | May 22, 1934 |
| 1,981,040 | Gulliksen | Nov. 20, 1934 |
| 1,999,646 | Wittkuhns | Apr. 30, 1935 |
| 2,086,601 | Caruthers | July 13, 1937 |
| 2,191,315 | Guanella | Feb. 20, 1940 |
| 2,424,568 | Isbister et al. | July 29, 1947 |
| 2,462,925 | Varian | Mar. 1, 1949 |
| 2,466,756 | White | Apr. 12, 1949 |
| 2,510,075 | Clavier et al. | June 6, 1950 |
| 2,513,367 | Scott | July 4, 1950 |
| 2,521,639 | Lauricella | Sept. 5, 1950 |
| 2,524,051 | Goertz | Oct. 3, 1950 |
| 2,531,727 | Emerson | Nov. 28, 1950 |

FOREIGN PATENTS

| | | |
|---|---|---|
| 33,746 | Holland | Sept. 16, 1934 |